Patented July 5, 1938

2,122,781

UNITED STATES PATENT OFFICE 2,122,781

PARASITICIDES

Paul L. Salzberg, Edge Moor, Del., assignor, by mesne assignments, to E. I. du Pont de Nemours & Company, Wilmington, Del., a corporation of Delaware No Drawing. Application May 16, 1935, Serial No. 21,811

16 Claims. (Cl. 167—30)

The present invention relates to new cyclo alkyl thio-cyano esters and their uses as parasiticidal agents, particularly cycloalkyl thiocyanates.

My novel parasiticidal agents are broadly represented by the formula $R(XCN)_y$ in which R is an alicyclic hydrocarbon radical containing at least 10 carbon atoms, X is selected from the group consisting of sulfur, selenium and tellurium, y is a simple digit corresponding to the valency of radical R.

My novel parasiticides are most conveniently obtained from the alcohols R—OH in which R has the same characteristics as above.

These alcohols are first transformed into the corresponding halides or sulfates and these are then allowed to react with salts of thiocyanic, selenocyanic, tellurocyanic acid and their iso compounds.

The alcohols can also first be dehydrated to the corresponding unsaturated compounds and these then reacted with thiocyanogen.

The most effective parasiticides were obtained according to my invention when the radical R is of the nature of a hydrogenated aromatic compound, R is a terpenic radical or R is a naphthenic compound.

The character of R should be predominantly that of a cyclo-alkyl hydrocarbon radical but the presence of an aromatic group in the hydrocarbon molecule does not detract or impair the parasiticidal efficiency of the compound provided the CNX group is directly attached to the aliphatic end of the hydrocarbon radical.

While the CNX group is of decided influence upon the effectiveness of my novel compounds as parasiticides, the properties of the R radical contribute to a dominant extent upon the practical usefulness of these new compounds. Solubility, spreadability, and selective toxicity to lower forms of life depend upon the aliphatic-cyclic character of this group.

In the practical embodiment of my invention I derive my novel parasiticides from the following available raw materials:

I start with naphthenic acids which are obtained from certain petroleum oils. These acids are submitted to catalytic hydrogenation and the resulting alcohols are then reacted as above.

Terpenes are another source of my novel parasiticides and I mention the following as belonging to the group derived therefrom:

bornyl-thiocyanate, and iso-thiocyanate
terpineyl-thiocyanate, and iso-thiocyanate
menthyl-thiocyanate, and iso-thiocyanate
di-thiocyano-pinene
hydro-abietyl-thiocyanate, and iso-thiocyanate.

Hydrogenation of aromatic compounds produces a number of alcohols and unsaturated compounds from which novel parasiticides according to my invention are derived. I cite the following:

alpha-decahydro-naphthyl thiocyanate and
beta-decahydro-naphthyl thiocyanate

Particularly suitable from a practical standpoint of availability as parasiticides are the CNS esters of naphthenic alcohols obtained from the naphthenic acids of petroleum oils.

These naphthenic alcohols and the esters derived therefrom contain polymethylene rings of various sizes, one being, for example, a cyclopentane ring to which is attached an aliphatic side chain, the terminal carbon of which carried the original carboxyl group.

Naphthenyl thiocyanates of this type are characterized physically by their high fluidity and absence of crystalline or wax-like properties, even in the higher members of the series. Furthermore, the naphthenyl thiocyanates and their corresponding iso and seleno and telluro analogs have relatively little odor and are in this respect not objectionable as are the alkyl thiocyanates derived from lower alkyl groups, such as methyl, ethyl, propyl, etc.

These physical properties make the naphthenyl esters of the formula $R(CNS)_y$ particularly desirable for use as parasiticides.

Similarly other esters of the formula $R(CNS)_y$ are also characterized by a non-disagreeable odor, especially those derived from terpenes and having non-waxlike properties. In respect to solubility and dispersibility my novel parasiticides suffice all requirements for practical applications.

I shall in the following give various specific embodiments of my invention:

*Example 1.*—Naphthenyl thiocyanate from Russian naphthenic acids.

25 parts by weight of naphthenyl alcohols (hydroxyl number 332), (boiling point 101–141° C. under 19 mm. pressure) obtained by catalytic hydrogenation of the ethyl ester of Russian naphthenic acids were converted into the corresponding naphthenyl chlorides (B. P. 90–130° C. under 18 mm.) (chlorine content 18.79%) by treatment with 40 parts thionyl chloride in benzene. 18 parts of these naphthenyl chlorides in turn were reacted with 10 parts sodium thiocyanate in 100 parts refluxing butanol. After separation from the sodium chloride and the butanol solvent a light yellow limpid liquid having a characteristic thiocyanate odor was obtained. This boiled at 127–167° C. under 11 mm. pressure and represents the naphthenyl thiocyanate corresponding to the naphthenic acid employed. The product has a specific toxic effect against lower forms of life, particularly soft bodied insects.

Tests for the toxicity of these crude naphthenyl thiocyanates have shown the following results:

| Conc. in aqueous emulsion | Spreader | Insect | Kill |
|---|---|---|---|
| Percent | | | Percent |
| 0.1 | 0.1% sulfonated fish oil. | Chrysanthemum aphid. | 100 |
| 0.025 | 0.1% sulfonated fish oil. | ___do___ | 96.7 |
| 0.025 | 0.025% sulfonated fish oil. | Nasturtium aphid | 96.7 |

*Example 2.*—Naphthenyl thiocyanate from California naphthenic acids.

42 parts of naphthenyl alcohols (hydroxyl number 203, B. P. 120–165° C. under 1 mm. pressure) obtained by sodium reduction of the ethyl ester of naphthenic acids from Californian petroleum were converted into naphthenyl chlorides by treatment with thionyl chloride in benzene. These naphthenyl chlorides (12.47% Cl, B. P. 120–160° C. under 1 mm. pressure) were reacted with 10 parts sodium thiocyanate in 100 parts refluxing butanol. A practically odorless oil of a boiling point 155–187° C. under 1 mm. pressure was obtained which represents the thiocyanate of the naphthenyl hydrocarbon corresponding to the original naphthenic acids. The product has a specific toxic effect towards insects.

*Example 3.*—Bornyl thiocyanate.

60 parts by weight of crude bornyl chloride, 120 parts n-butanol, 37 parts sodium thiocyanate and 0.5 part of sodium iodide were refluxed for 92 hours. The crude reaction product was washed with water, and the butyl alcohol distilled off. The solid residue represents the bornyl thiocyanate.

With a 5% kerosene solution this crude bornyl thiocyanate showed a toxicity against the common house fly comparable with that of pyrethrum.

It will be understood that my invention is not limited to these specific thiocyanates but that it embraces broadly the parasiticides of the formula $R(CNX)_y$ as explained above, particularly those in which R is selected from naphthenic and cyclic terpene hydrocarbon radicals, which are also distinguished by slight odor and low viscosity of the compounds themselves or their solutions and emulsions and consequent high penetrability. In this respect they distinguish themselves particularly from the thiocyanates and other cyano esters of long carbon chain aliphatic alcohols, such as for instance the waxy stearyl thiocyanate.

My novel esters are especially useful as insecticides against soft bodied insects and as constituents of kerosene fly sprays.

I claim:

1. As a new compound a naphthenyl thiocyanate which at ordinary temperature is a liquid of low viscosity, boils in vacuo without substantial decomposition and has a specific toxicity against soft bodied insects.

2. An insecticidal composition comprising as the toxic ingredient bornyl thiocyanate.

3. An insecticidal composition comprising as the toxic ingredient a naphthenyl thiocyanate.

4. Compounds of the formula $R(CNX)_y$ in which R is an alicyclic hydrocarbon radical of valence $y$ and containing at least 10 carbon atoms and X is an element selected from Group VI—B of the periodic table.

5. Compounds of the formula $R^1(CNX)_y$ wherein $R^1$ is an alicyclic hydrocarbon radical of valence $y$ and chosen from the group consisting of naphthenyl radicals and cyclic terpene hydrocarbon radicals, and X is an element selected from Group VI—B of the periodic table.

6. Compounds of the formula RCNS wherein R is an alicyclic hydrocarbon radical containing at least 10 carbon atoms.

7. Compounds of the formula $R^1$CNS wherein $R^1$ is an alicyclic hydrocarbon radical chosen from the group consisting of naphthenyl radicals and cyclic terpene hydrocarbon radicals.

8. Compounds of the formula $R^2$CNX wherein $R^2$ is a cyclic terpene hydrocarbon radical and X is an element selected from Group VI—B of the periodic table.

9. Compounds of the formula $R^2$CNS wherein $R^2$ is a cyclic terpene hydrocarbon radical.

10. The compound bornyl thiocyanate.

11. An insecticidal composition comprising as the toxic ingredient a compound of the formula $R(CNX)_y$ in which R is an alicyclic hydrocarbon radical of valence $y$ and containing at least 10 carbon atoms and X is an element selected from Group VI—B of the periodic table.

12. An insecticidal composition comprising as the toxic ingredient a compound of the formula $R^1(CNX)_y$ wherein $R^1$ is an alicyclic hydrocarbon radical of valence $y$ and chosen from the group consisting of naphthenyl radicals and cyclic terpene hydrocarbon radicals, and X is an element selected from Group VI—B of the periodic table.

13. An insecticidal composition comprising as the toxic ingredient a compound of the formula RCNS wherein R is an alicyclic hydrocarbon radical containing at least 10 carbon atoms.

14. An insecticidal composition comprising as the toxic ingredient a compound of the formula $R^1$CNS wherein $R^1$ is an alicyclic hydrocarbon radical chosen from the group consisting of naphthenyl radicals and cyclic terpene hydrocarbon radicals.

15. An insecticidal composition comprising as the toxic ingredient a compound of the formula $R^2$CNX wherein $R^2$ is a cyclic terpene hydrocarbon radical and X is an element selected from Group VI—B of the periodic table.

16. An insecticidal composition comprising as the toxic ingredient a compound of the formula $R^2$CNS wherein $R^2$ is a cyclic terpene hydrocarbon radical.

PAUL L. SALZBERG.